(12) United States Patent
Bahniuk (10) Patent No.: US 7,568,661 B2
(45) Date of Patent: Aug. 4, 2009

(54) CANOPY QUICK RELEASE DEVICE FOR PARACHUTES

(75) Inventor: Eugene Bahniuk, Gates Mills, OH (US)

(73) Assignee: Douglas Bahniuk, Cleveland Heights, OH (US)

( * ) Notice: Subject to any disclaimer, the term of this patent is extended or adjusted under 35 U.S.C. 154(b) by 676 days.

(21) Appl. No.: 11/333,632

(22) Filed: Jan. 17, 2006

(65) Prior Publication Data

US 2006/0273225 A1    Dec. 7, 2006

Related U.S. Application Data

(60) Provisional application No. 60/644,250, filed on Jan. 14, 2005.

(51) Int. Cl.
*B64D 17/32* (2006.01)
(52) U.S. Cl. .................. 244/151 B; 24/629; 24/644
(58) Field of Classification Search ............. 244/147, 244/149, 151 A, 151 B, 151 R; 24/629, 633, 24/640, 642, 644, 641
See application file for complete search history.

(56) References Cited

U.S. PATENT DOCUMENTS

| 2,447,921 | A | 8/1948 | Thomas |
| 2,473,554 | A | 6/1949 | Warner et al. |
| 2,834,083 | A | 5/1958 | Newell et al. |
| 3,200,463 | A | 8/1965 | Craven et al. |
| 4,030,689 | A | 6/1977 | Rodriguez |
| 4,307,858 | A | 12/1981 | Naab et al. |
| 4,365,776 | A | 12/1982 | Gaylord et al. |
| 4,612,687 | A | 9/1986 | Barwood |
| 4,684,083 | A | 8/1987 | Maziarz |
| 5,887,825 | A | 3/1999 | Noel |
| 6,249,937 | B1 | 6/2001 | Grenga |
| 6,644,597 | B1 | 11/2003 | Bahniuk |

*Primary Examiner*—Timothy D Collins
(74) *Attorney, Agent, or Firm*—Pearne & Gordon LLP (57) ABSTRACT

A base is attachable to a first object and a bar is attachable to a second object. A pivot lever having a lip is engaged with the bar. The base is configured to engage said pivot lever to define a fulcrum. A retainer engaged with said pivot lever. A keeper secures the retainer to the base so that the retainer restricts pivoting of the pivot lever about the fulcrum thereby securing the bar to the base. The keeper is operable to release the retainer to permit rotation of the pivot lever about the fulcrum to release the bar from the base, thereby releasing the objects from being connected together.

22 Claims, 13 Drawing Sheets

CANOPY QUICK RELEASE DEVICE FOR PARACHUTES

CROSS-REFERENCE TO RELATED APPLICATIONS

This application claims the benefit of U.S. Provisional Patent Application No. 60/644,250 filed on Jan. 14, 2005, the entirety of which is incorporated by reference herein.

BACKGROUND OF THE INVENTION

The present invention relates to a parachute canopy quick release device.

Releasing an entangled main canopy from a person or package in free fall is the first step in the sequence of deploying a reserve canopy. If the entangled main canopy is not released, the possibility that the reserve canopy will become entangled with the main canopy is significant. A main canopy may also have to be released after a person/package has landed, in order to prevent the canopy from inflating, due to wind, and dragging the person along the ground. This scenario is particularly important if high winds exist in the landing area.

When used by a person, a canopy is attached at the person's right and left shoulders by the canopy risers.

Several devices exist in an attempt to release the main canopy. Some prior art devices require the user to separately release a mechanism at each shoulder. These devices require a relatively long period to release, a disadvantage when an individual is falling at terminal velocity, about 120 mph, at low altitudes.

Other devices automatically release the canopy at both shoulders when a person pulls a cord; however these devices are easily assembled in an improper manner and thus prone to failure.

Some prior art devices fail in use and only release one side of the canopy and not the other. The user is thus faced with the unpleasant option of trying to clear the malfunction and running out of altitude, or releasing the reserve into the main, with the increased chance of reserve failure.

Some prior art devices require lubrication and are thus prone to failure if the lubricant is lacking. An overly lubricated device may stain the canopy's risers or the user's clothing, or the lubricant can adversely affect riser strength.

Other prior art devices require a relatively force to activate, or are large, bulky, relatively heavy, or easily fouled by dirt.

Multiple problems have been identified with one of the most popular systems, commonly called a three-ring release. The rings may deform under high loads. The rings must have metal-to-metal contact: if the large ring is not in contact with the second ring, but is touching the riser webbing, the load transferred to the small ring and loop is drastically increased. Rings also sometimes deform when the parachutist opens the canopy while falling in an unstable attitude, thereby placing a high load on the rings. Rings must be rotated periodically to prevent elongation or deformation.

SUMMARY OF THE INVENTION

The invention is a secure and release mechanism that detachably connects two objects together, and includes a base, which attaches to a first object; and a ring, which attaches to a second object. The ring is fitted to a pivot lever, the combined ring and pivot lever are nested in the base. A spring may be fitted between the pivot lever and base. The nested pivot lever and ring are fitted with a retainer, and the entire assembly held together with a keeper such as a ripcord. A pocket located at one end of the base accepts a corresponding end of the pivot lever; together these form a fulcrum. The end of the pivot lever can be tapered or otherwise contoured to mate with the base and aid to the release. The pocket can be formed by pins or a lip or other suitable projection. The assembled mechanism can form an unstable system with a natural tendency to rotate at the fulcrum, but is restrained from doing so by the retainer. The ring is able to rotate within its nested position in the base, however the base limits its degree of rotation.

Loads placed on the ring are transmitted through the pivot lever and countered by the base.

The mechanism recited has a means to attach to a parachute canopy, such as a loop, ring or slot and also a means to attach to a parachute harness. When used to link a parachute canopy and parachute harness, two of the mechanisms recited can be used together, one at each shoulder, and the means for release can be combined. Then a single pull on one ripcord will release both mechanisms, thereby detaching the parachute harness from the parachute canopy.

The mechanism then, detachably connects a parachutist to a parachute, and is comprised of: a base; a pivot lever; said pivot lever having means to accept a ring; a ring; a spring; a retainer; said base having a hole or other means to accept a ripcord or other locking method; said base having holes to accept a strap or straps of a parachute; said base having tabs along its sides designed to limit rotation of said ring; said base having scallops or indentations or otherwise be designed to provide clearance from straps attached to said base.

DETAILED DESCRIPTION OF THE INVENTION

As required, detailed embodiments of the present invention are disclosed here. However, it is understood that the disclosed embodiments are merely exemplary of the invention, which may be embodied in various forms. Therefore, specific structural and functional details disclosed are not to be interpreted as necessarily limiting, but merely as a basis for the claims and as a representative basis for teaching one skilled in the art to variously employ the present invention in virtually any appropriately detailed structure.

This invention includes a base, spring, pivot lever, ring, and retainer and relates to attachment methods of parachute canopies and harness to people and objects. The invention provides a method to quickly detach two objects that are linked together with the invention, and while the example of parachute canopies and related harnesses is used, the invention has other uses as well. For example, people using rappelling gear can use the invention in order to provide a quick release from such gear. As another example, the invention can be used to secure and release the ends of a restraining wire or wires.

The means of construction of the device depends on the application and forces placed on it in that application. In critical applications such as parachuting or rappelling, the device is preferably constructed of a metal such as steel, aluminum, or titanium and forged. In less critical applications such as fastening the ends of a packing wire together, the device may be stamped steel or molded plastic.

The device includes a base with integrated guides, and holes, a pivot lever, a spring, a ring, a retainer, and a keeper such as a ripcord, strap, or other device. The retainer can be a plate or tube, rod, or other device. In the example of a parachutist, the base is attached to the parachute's webbing, the ring to the canopy risers. In use, the base stays attached to the parachutist or package, while the ring separates from the base and remains attached to the canopy risers.

The base uses a pocket, tabs and holes to align the pivot lever and ring. The base may have indentations or scallops to provide room for the canopy risers looped through the pivot lever and ring. The bottom of the base is designed to accept, and hold in place, the pivot lever and ring combination.

When the parachutist wishes to release the main canopy, he pulls on a pull ring. The pull ring is attached to a bifurcated ripcord. One side of the bifurcated ripcord goes to the device on the users right shoulder, the other side goes to the device on the left shoulder. The force on the pull ring dislodges the ripcords on both devices. This allows the retainers on each device to fall away. The pivot lever and ring combination pivots on a beveled edge of the pivot lever, allowing the ring with risers to separate from the base. The parachutist now falls away from canopy.

The base, pivot lever and ring may be flat, curved or hinged to provide better fit to the user or package.

While the drawings include the exemplary embodiments, the drawings are merely meant to be representative of the invention and not absolute with regard to particular profiles, angles, curves, and sizes.

Figure 1:
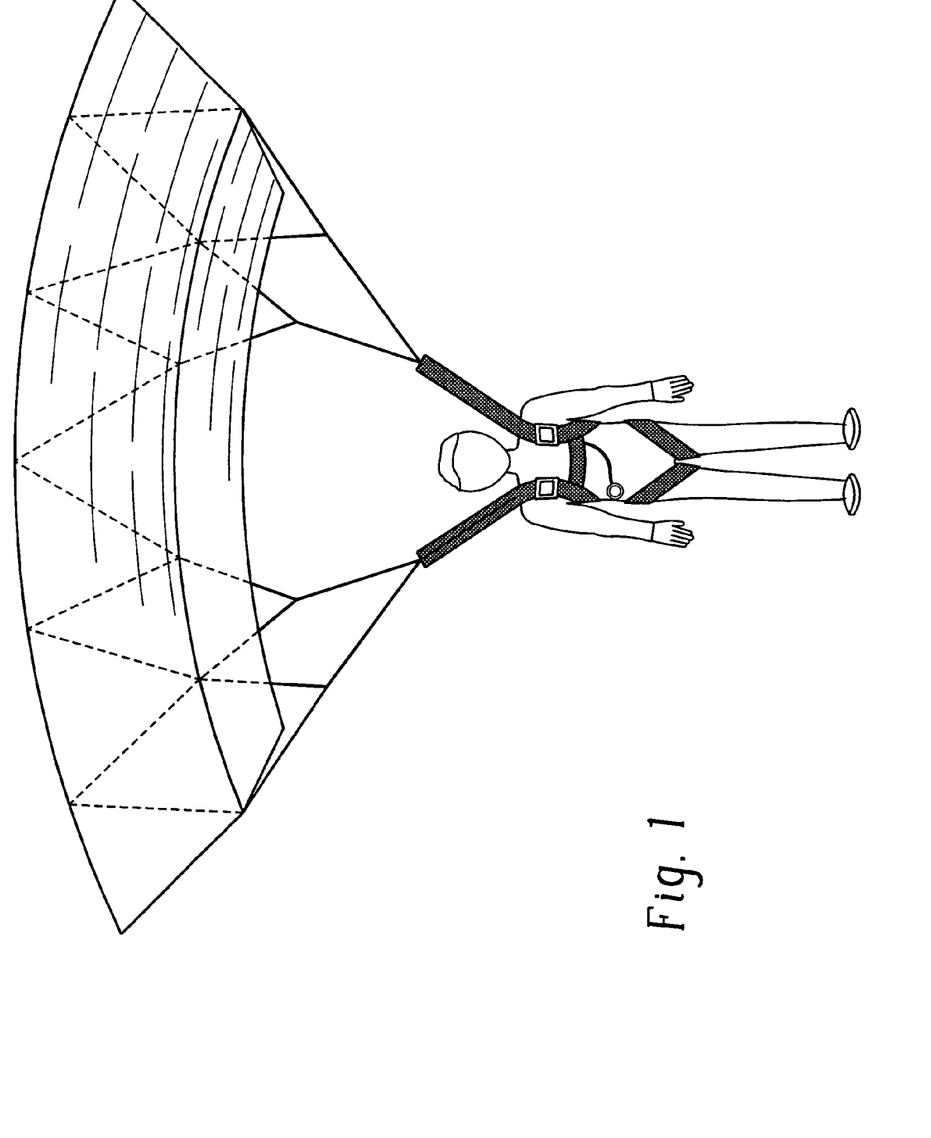
FIG. 1 is a partial view of a parachutist under a canopy.
Figure 2:
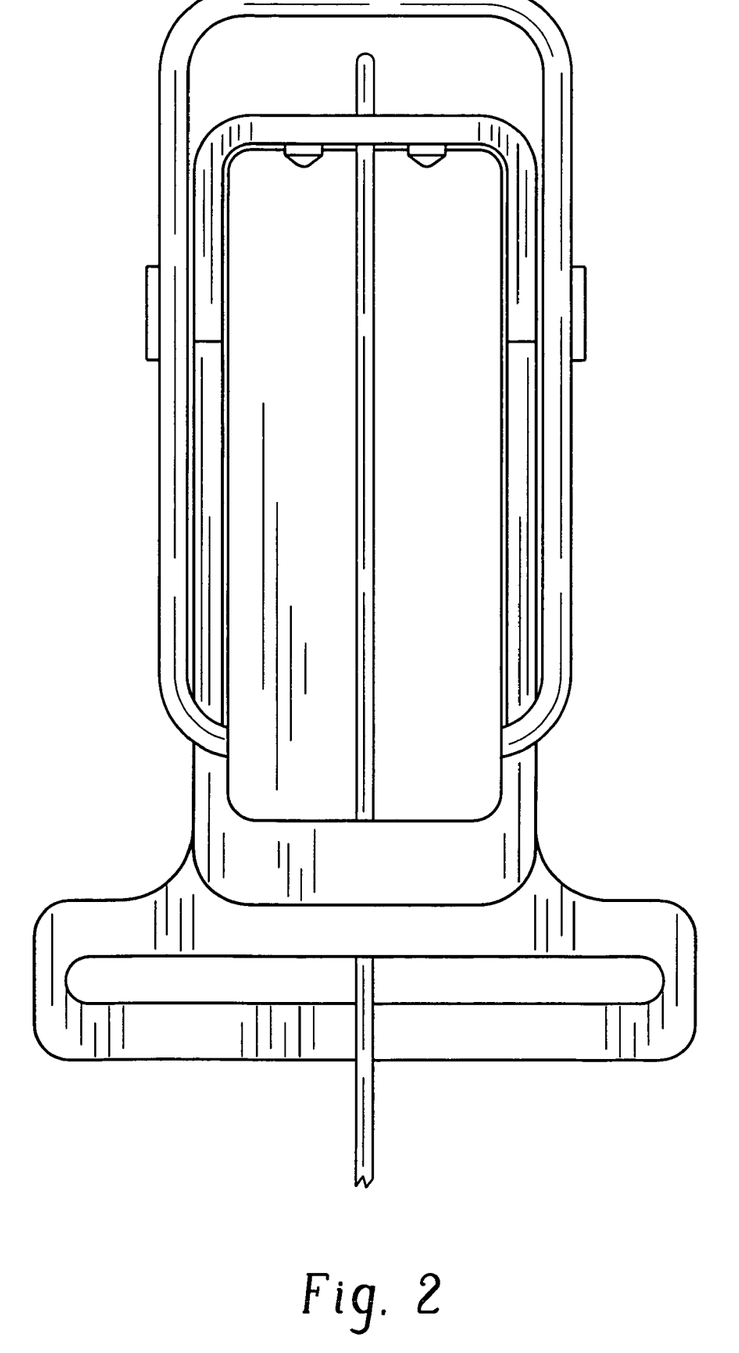
FIG. 2 is a front view of the canopy quick release device of the present invention.
Figure 3:
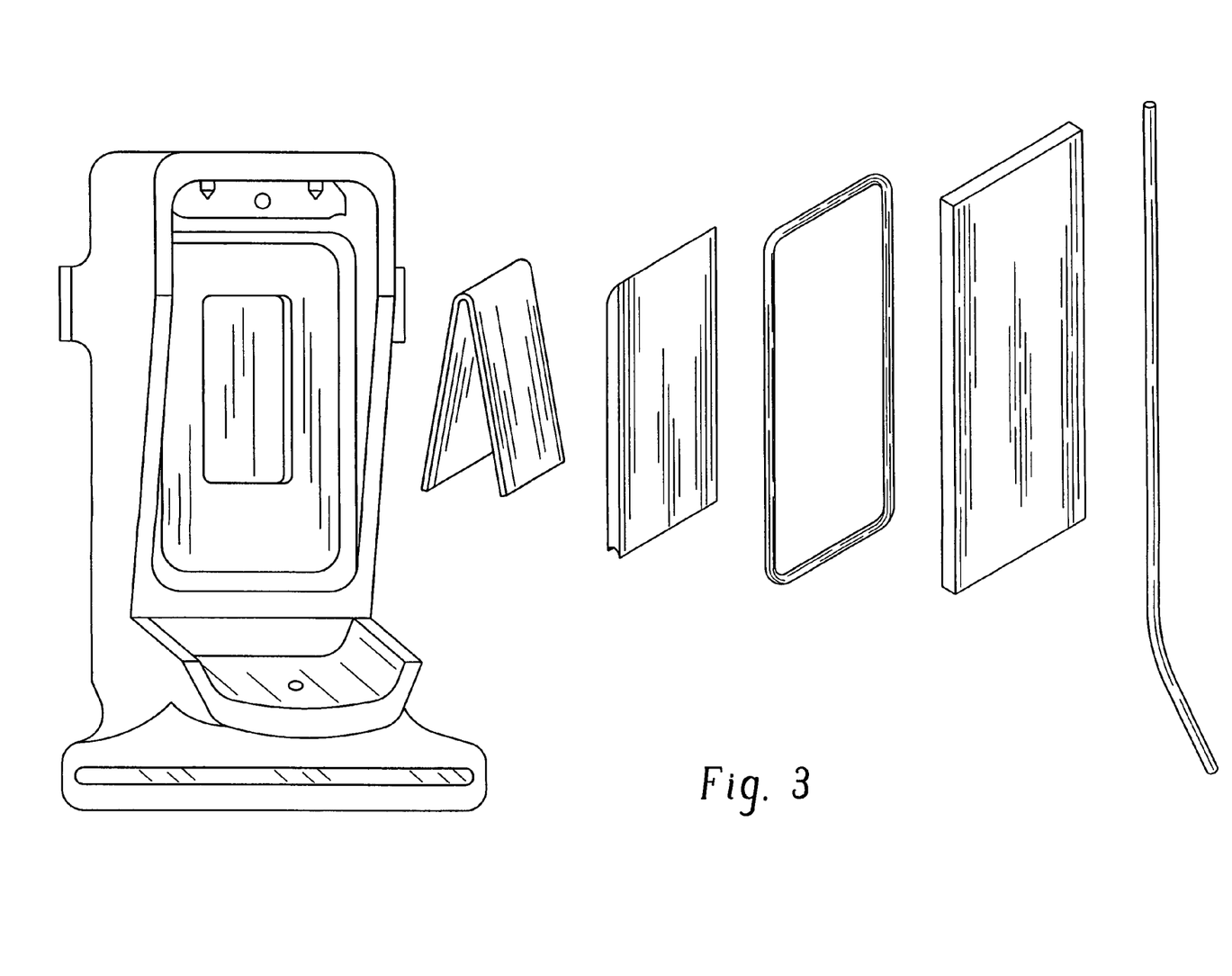
FIG. 3 is a perspective view of a disassembled canopy quick release device of the present invention.
Figure 4:
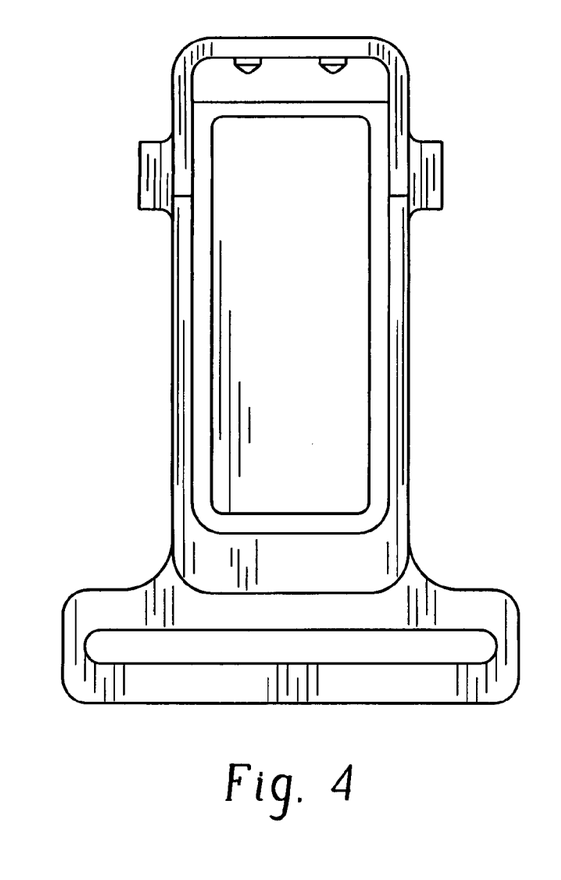
FIG. 4 is a front view of the base.
Figure 5:
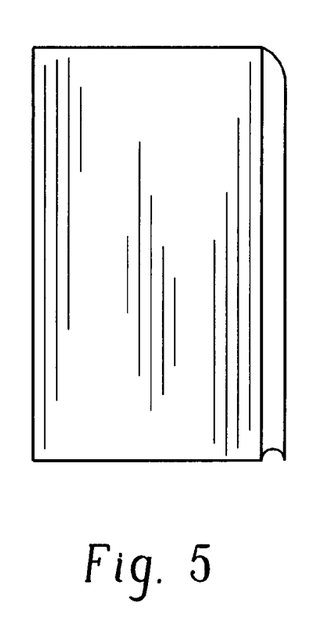
FIG. 5 is a front view of the pivot lever.
Figure 6:
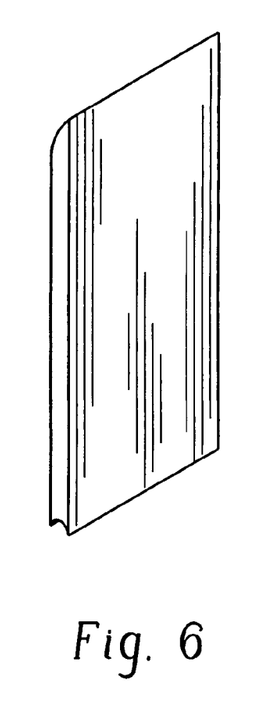
FIG. 6 is a perspective side view of the pivot lever.
Figure 7:
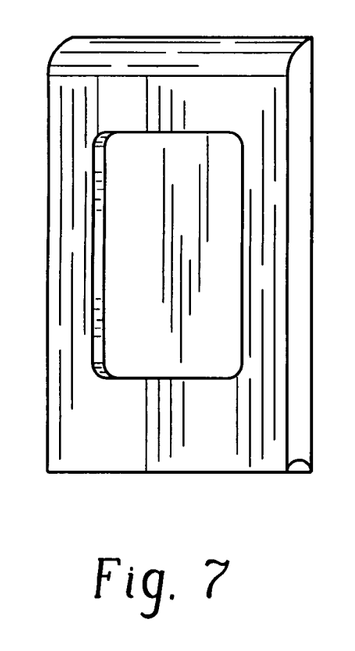
FIG. 7 is a rear view of the pivot lever.
Figure 8:
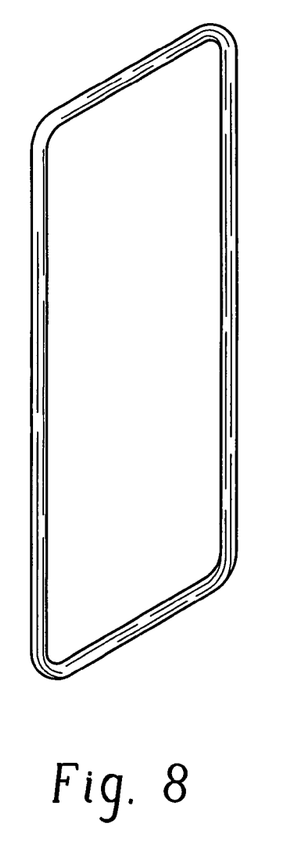
FIG. 8 is a perspective view showing the ring.
Figure 9:
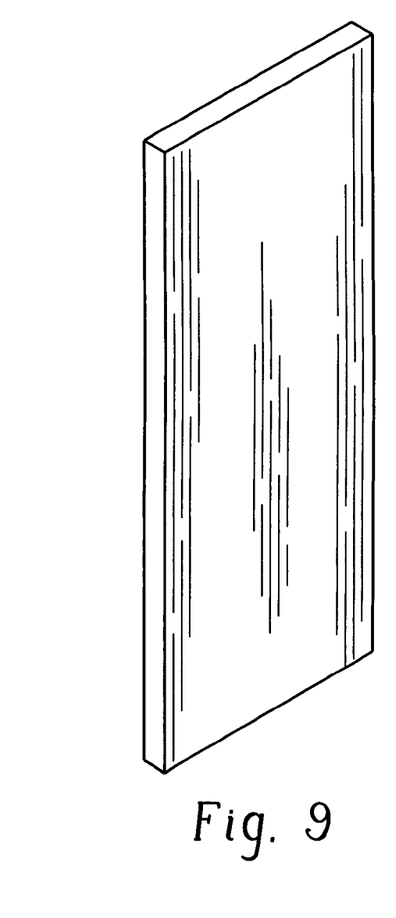
FIG. 9 is a perspective view of the retainer.
Figure 10:
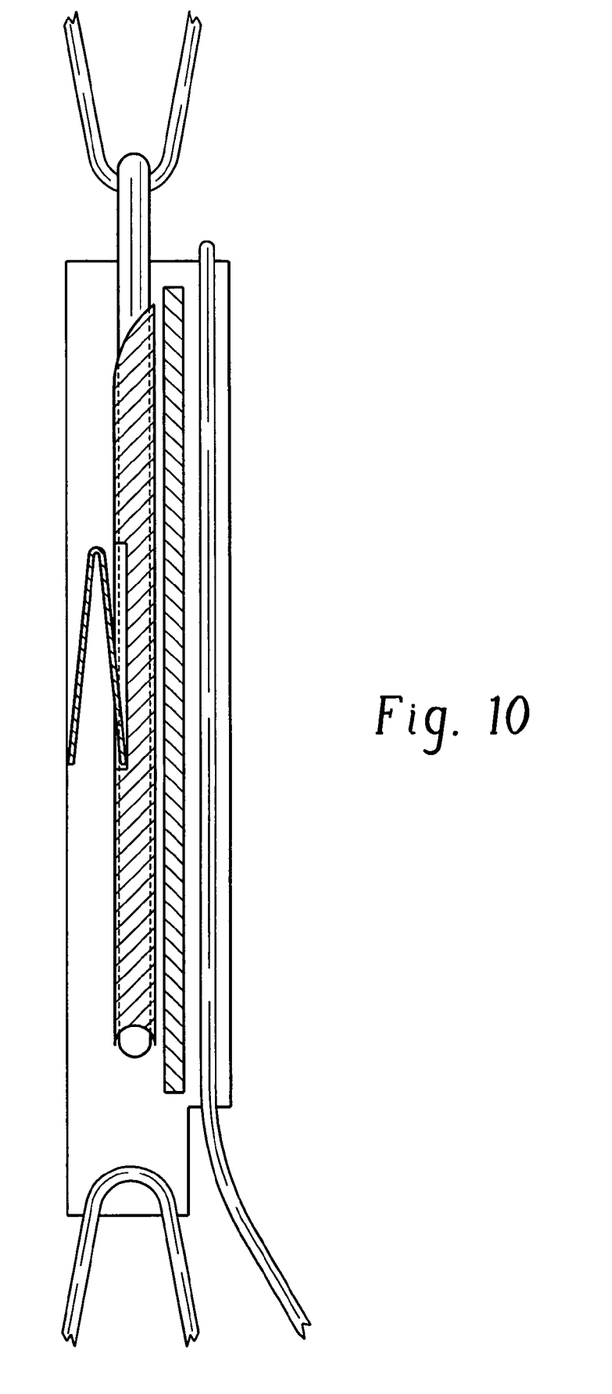
FIG. 10 is a sectional side view of the assembled canopy quick release device.
Figure 11:
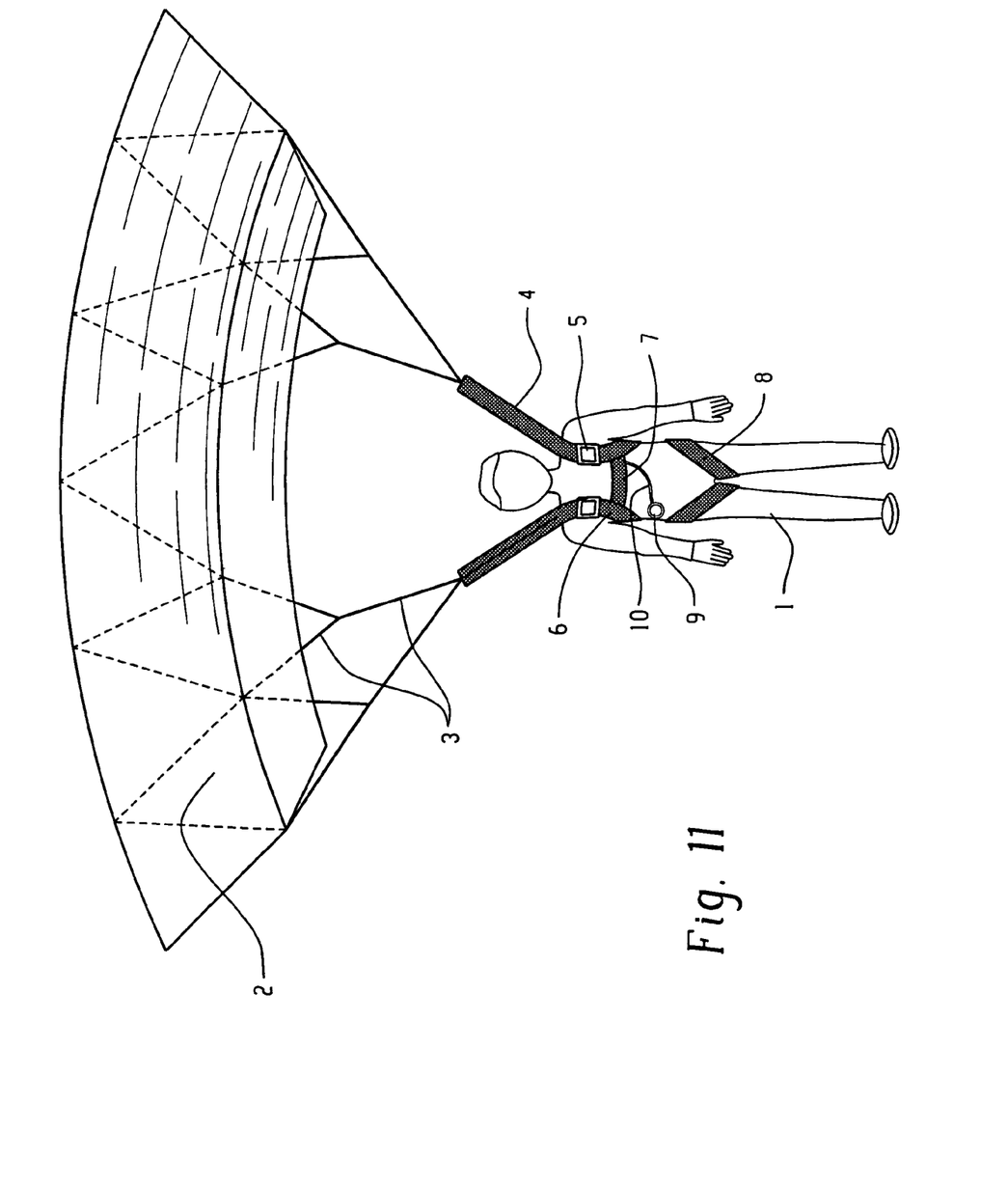
FIG. 11 shows a parachutist suspended under a canopy.

Referring to FIG. 11, there is a parachutist 1 suspended under a canopy 2. Canopy lines 3 come to a confluence at risers 4. The risers 4 are linked through a canopy quick release device 5 to parachute harness webbing 6. A chest strap 7 links parachute harness webbing 6 to prevent the parachutist 1 from falling out of the parachute harness webbing 6 when the canopy 2 inflates. Leg straps 8 support the lower body of the parachutist 1 during canopy 2 inflation. A pull ring 9 is used to activate the canopy quick release device 5 and is linked to the canopy quick release device 5 through a bifurcated cord 10.

Figure 12:
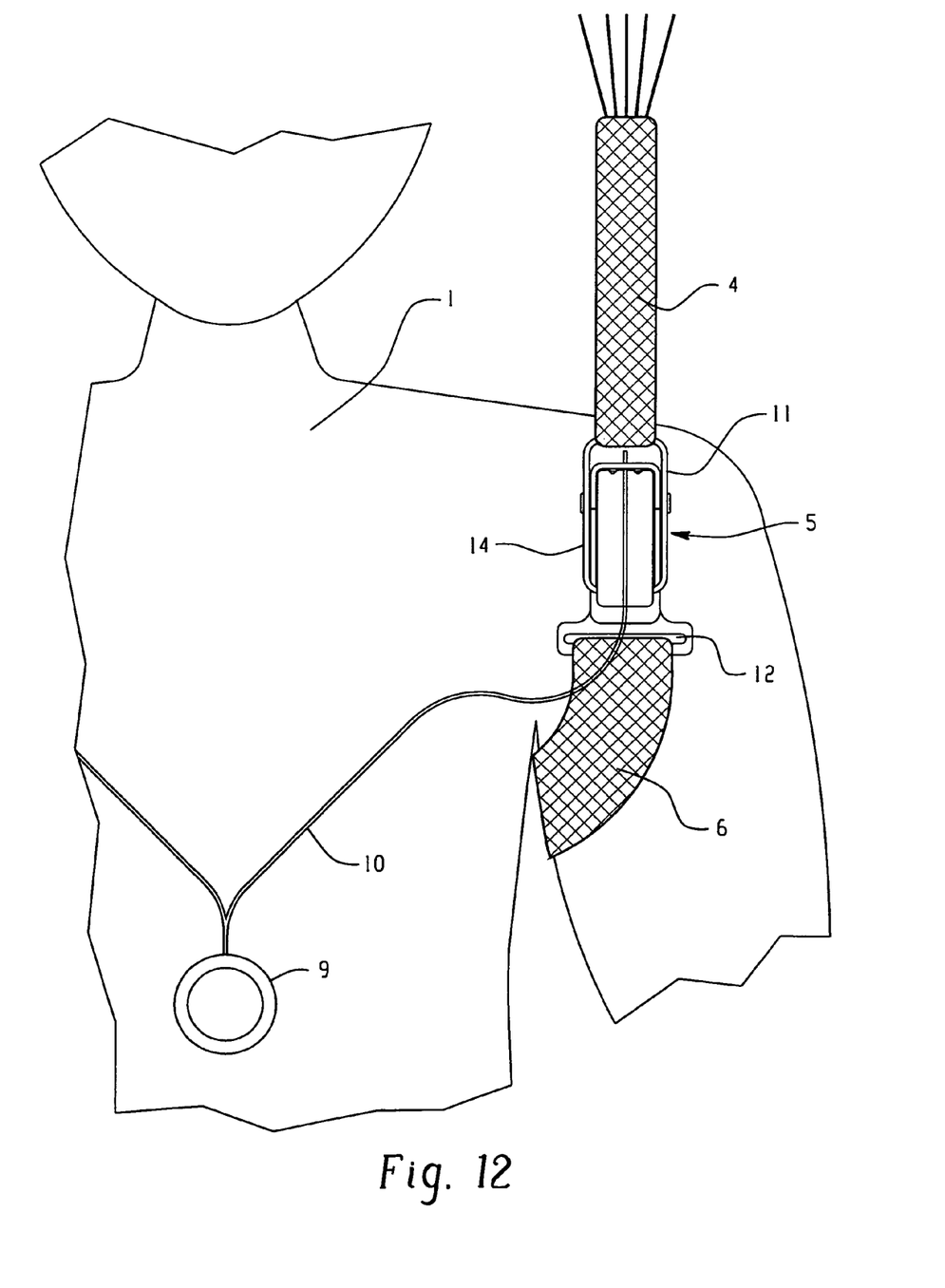
FIG. 12 shows an enlarged, detailed view of a parachutist.

FIG. 12 shows an enlarged, detailed view of the parachutist 1 with the chest strap omitted for clarity. The risers 4 are looped through a ring 11 of the canopy quick release device 5. The parachute harness webbing 6 is also fed through an oblong hole 12 of a base 14 of the canopy quick release device 5. To release the canopy 2, the parachutist 1 pulls on the pull ring 9. Pull ring 9 acts on the assembled canopy quick release device 5 through the bifurcated cord 10.

Figure 13:
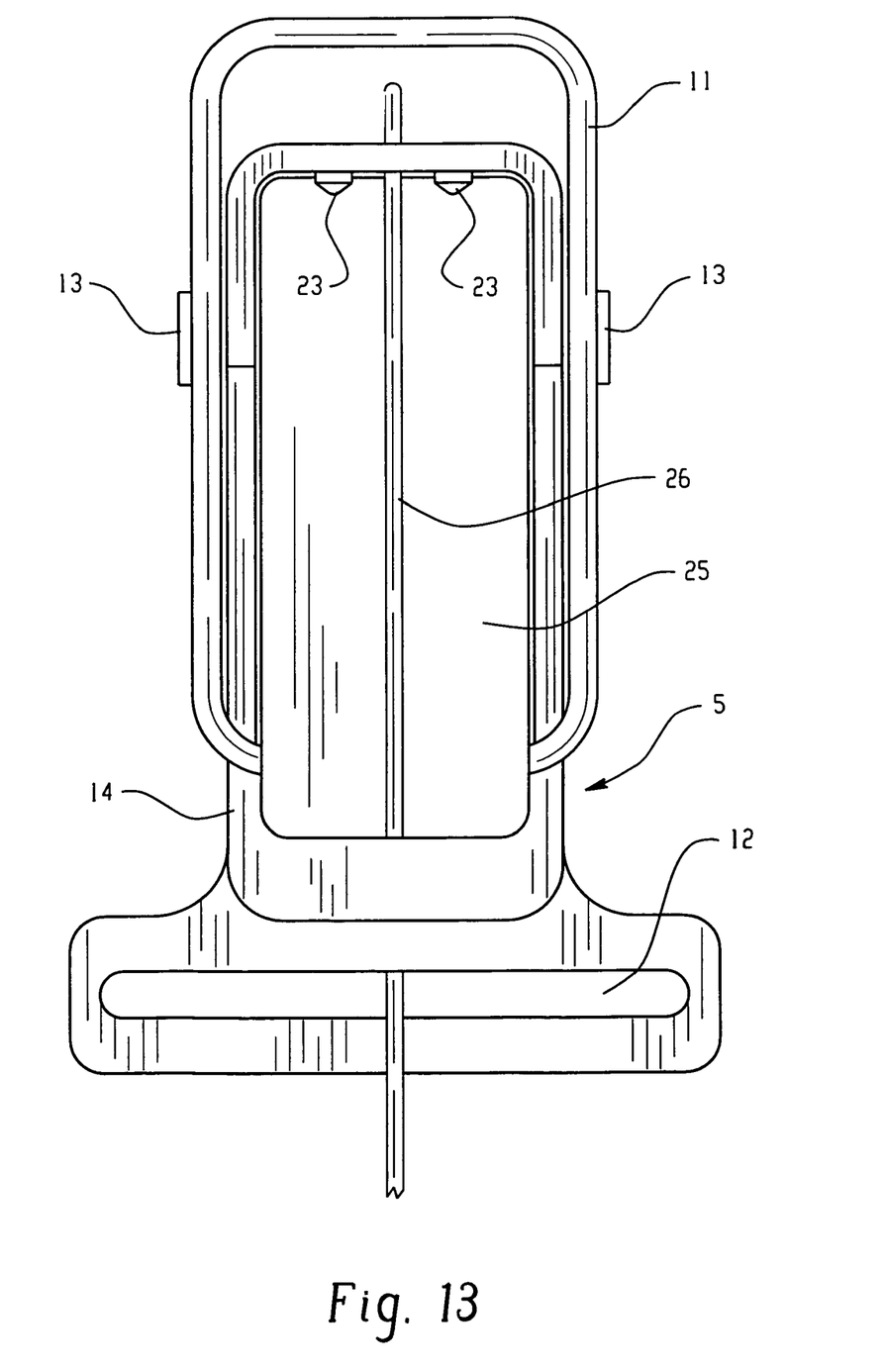
FIG. 13 shows an assembled canopy quick release device.

FIG. 13 shows the assembled canopy quick release device 5 with tabs 13 protruding from the sides. The parachute harness webbing 6 extends through the oblong hole 12 of the base 14 for attachment of the webbing to the base. The tabs 13 on the base 14 help align and hold a pivot lever/ring combination 15 in place. A profile of the base 14 may be curved or flat. A profile of the pivot lever/ring combination 15 may be curved or flat. A retainer 25 fits under retainer tabs 23. The retainer 25 can be formed as a plate a bar or other device that can hold the pivot lever on the base. A keeper, such as a ripcord 26, holds the retainer 25 against the pivot lever, which secures the ring to the base. The keeper can be formed by a rod or bar or other removable device.

Figure 14:
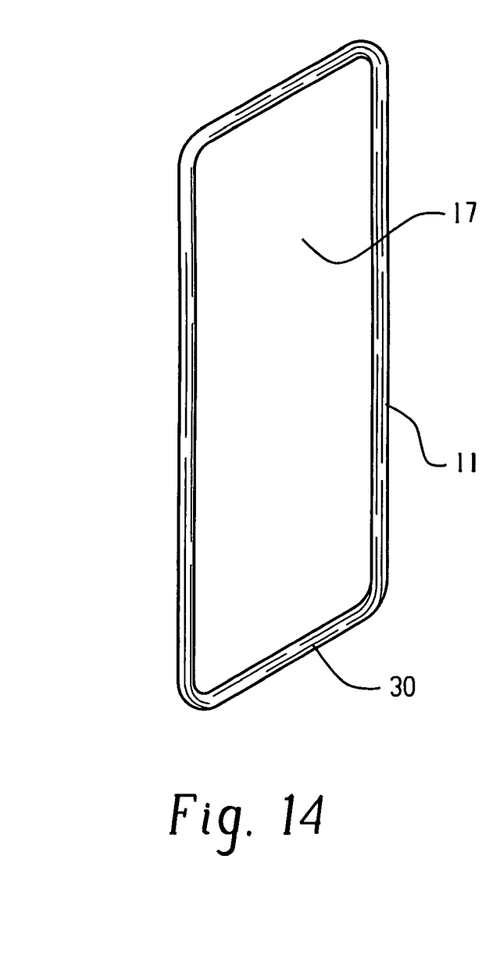
FIG. 14 is a frontal view of the ring.

FIG. 14 is a frontal view of the ring 11 showing a hole 17 through which the canopy risers 4 extend for attachment to the ring. At least part of the ring forms a bar 30, in the form of a rod or other suitable shape.

Figure 15:
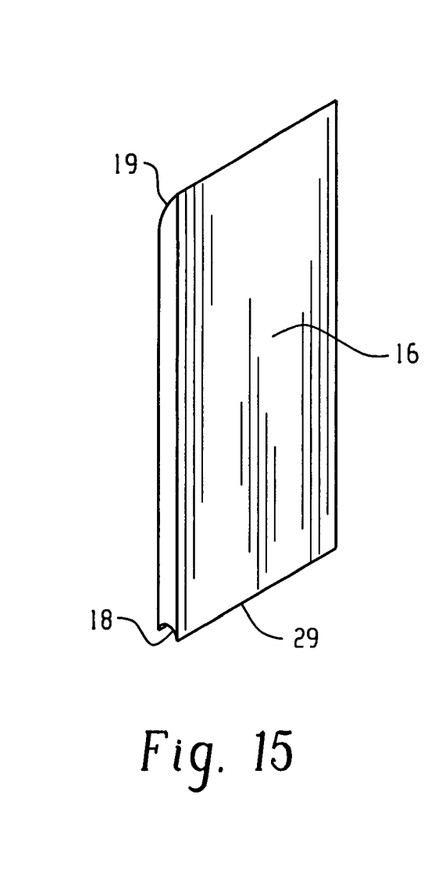
FIG. 15 is a perspective view of the pivot lever.

FIG. 15 is a perspective view of the pivot lever 16, showing a concave groove 18 for receiving the ring 11. The pivot lever can be a plate, one side of which has an edge lip 29 that can be defined by a the concave groove 18, or a channel, scallop, projection, or the like. The pivot lever 16 can have a tapered or beveled edge 19 opposite from, and distal to, the concave groove which engages the base 14 when the pieces are assembled. The beveled edge facilitates rotation.

Figure 16:
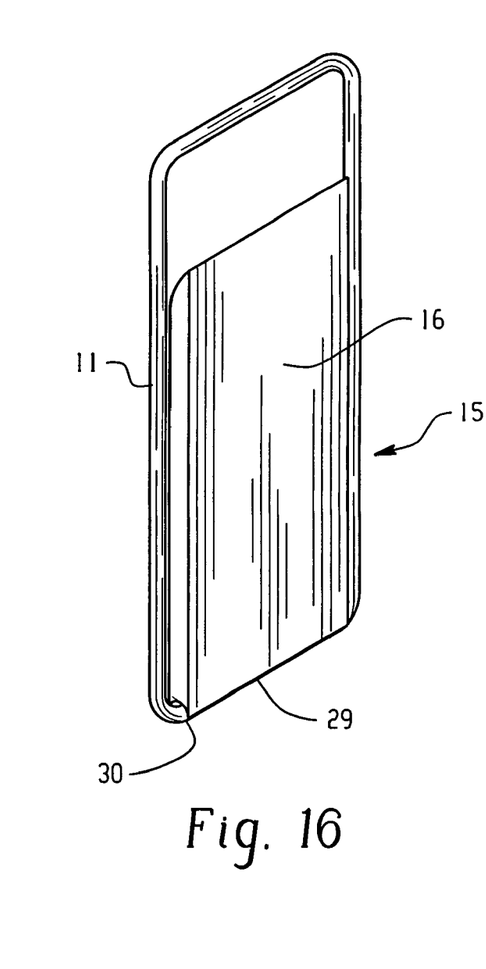
FIG. 16 is a perspective view of the pivot lever/ring combination.

FIG. 16 is a perspective view of a pivot lever/ring combination 15 showing the ring 11 and pivot lever 16. The bar 30 of the ring 11 engages the lip 29 by fitting into the groove.

Figure 17:
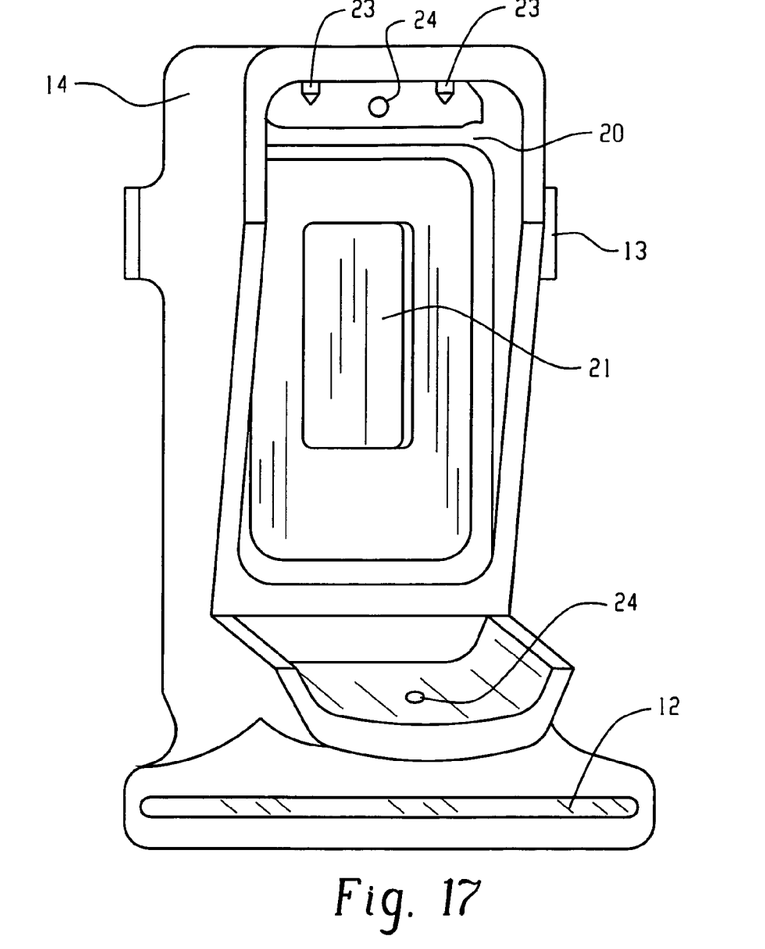
FIG. 17 is a perspective view of the base.

FIG. 17 is a perspective view of base 14 showing a fulcrum pocket 20, the tabs 13, the oblong hole 12, a spring hole 21, retainer tabs 23, and ripcord holes 24. Alternative profiles of the base are possible. For example, the tabs 13 may extend from edges of the base 14 or extend from edges of the pivot lever 16. The holes can be formed as slots or otherwise provide a structure for attachment of the riser and webbing. The fulcrum pocket can be formed as a lip or a tab or a projection engaged by the pivot lever.

Figure 18:
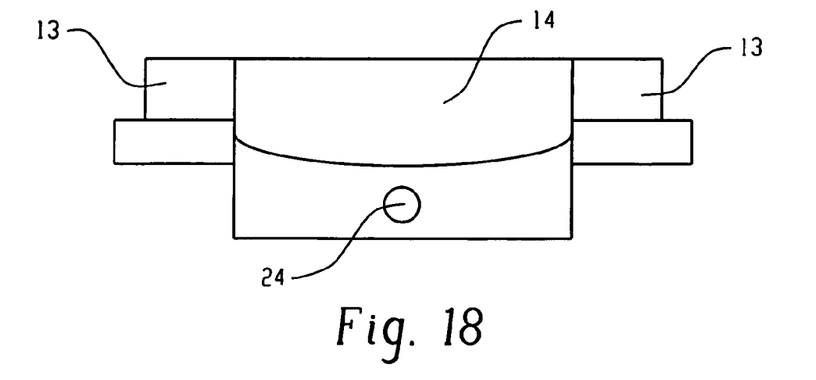
FIG. 18 is a top view of the base.

FIG. 18 is a top view of the base 14 showing one ripcord hole 24 and the tabs 13.

Figure 19:
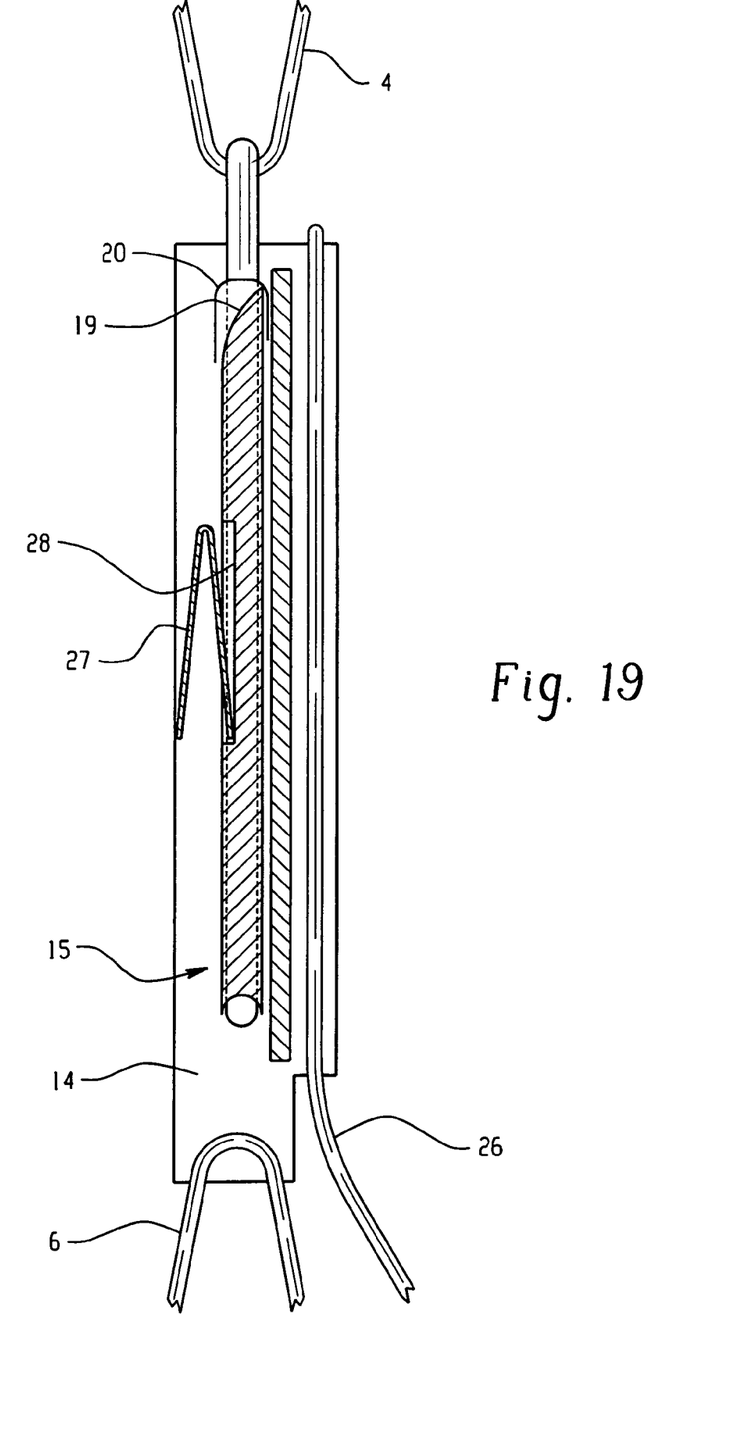
FIG. 19 is a side view of the assembled canopy quick release device.

FIG. 19 is a sectional side view of the assembled canopy quick release device showing the base 14, the ripcord 26, the parachute harness webbing 6, the pivot lever/ring combination 15, and the canopy riser 4. The beveled edge 19 of the pivot lever fits into the pocket 20 to define a fulcrum. The ripcord 26 extends through the ripcord holes 24 of the base 14. The Referring to FIGS. 11, 12, 13, 19, and 20, when the parachutist wishes to release the main canopy 2, he pulls on the pull ring 9. The pull ring 9 operates the ripcord 26 by action of the bifurcated cord 10, which causes the ripcord to slide out of the ripcord holes 24 and releases retainer 25. This allows the ring 11 to separate from the base 14 and allows the pivot lever and ring combination 15 to pivot on beveled edge 19 under a force of the canopy 2 and parachutist 1 imparted to the riser 4 and webbing 6. This force can be supplemented by a spring 27, such as a V spring disposed in a pocket 28 of the pivot lever 16, urging the pivot lever away from the base 14. Alternative methods are possible, for example a coiled spring or leaf spring can be used in place of the V spring. The ring 11 subsequently separates from the pivot lever 16 and Parachutist 1 now falls away from canopy 2.

Figure 20:
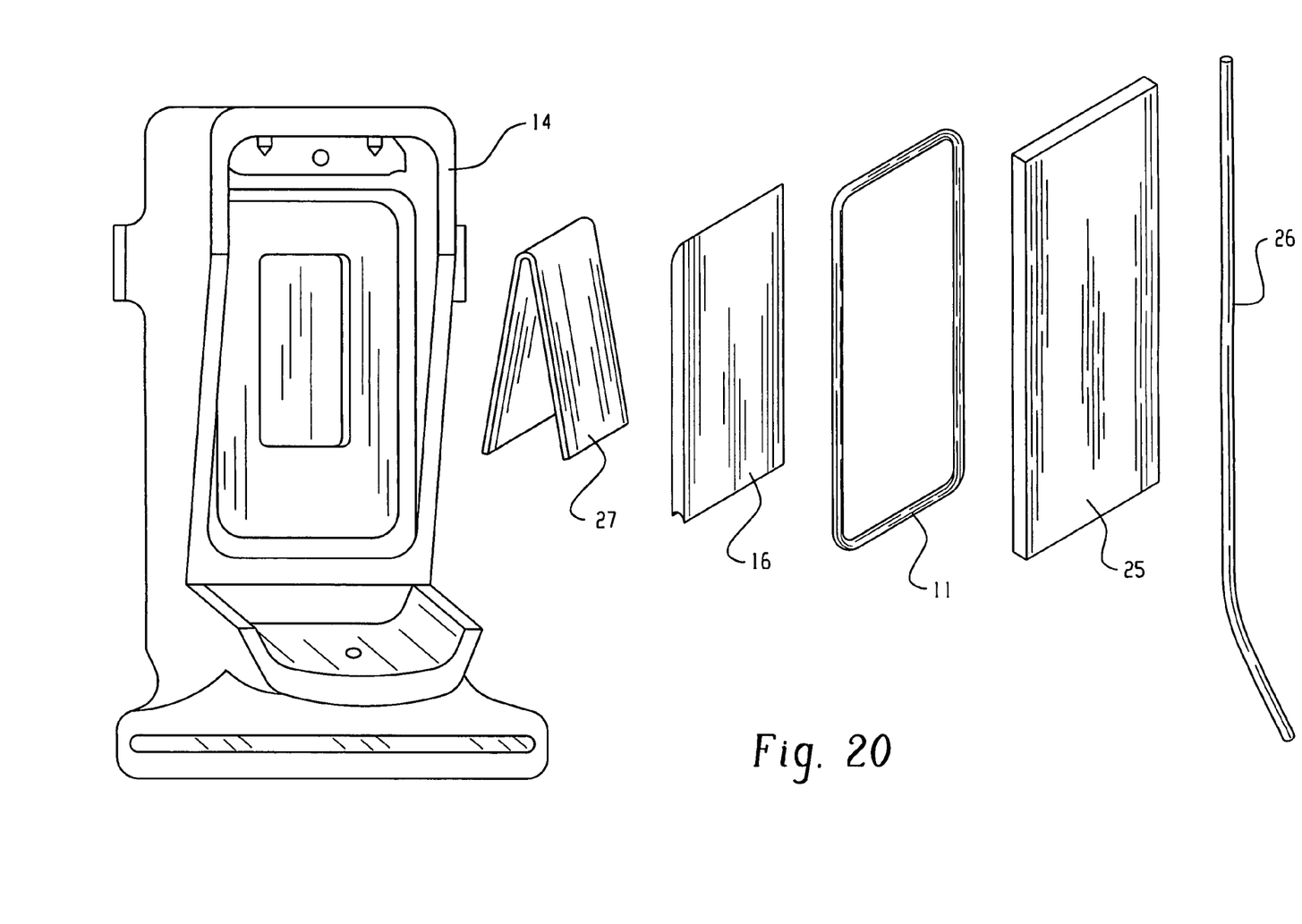
FIG. 20 is an exploded perspective view of the device.

FIG. 20 is an exploded perspective view showing: the base 14, the spring 27, the ring 11, the pivot lever 16, the retainer 25, and the ripcord 26.

What is claimed is:

1. A secure and release mechanism for detachably connecting two objects together, comprising:
   a base attachable to a first one of the objects;
   a bar attachable to a second one of the objects;
   a pivot lever having a lip engaged with said bar, said base being configured to engage said pivot lever to define a fulcrum;
   a retainer engaged with said pivot lever;
   a keeper securing said retainer to said base so that the retainer restricts pivoting of said pivot lever about said fulcrum thereby securing the bar to the base,
   wherein the keeper is operable to release said retainer to permit rotation of said pivot lever about said fulcrum to release the bar from the base, thereby releasing the objects from being connected together.

2. The mechanism of claim 1 wherein the bar comprises part of a ring.

3. The mechanism of claim 1 wherein the retainer is a plate.

4. The mechanism of claim 1 wherein an end of the pivot lever engages the base.

5. The mechanism of claim 1 wherein the pivot lever is a plate having the lip at one end.

6. The mechanism of claim 1 wherein the base further comprises a pocket engaged by the pivot lever to define the fulcrum.

7. The mechanism of claim 1 wherein the keeper is a cord.

8. The mechanism of claim 1 wherein the keeper extends through holes in the base.

9. The mechanism of claim 1 wherein the keeper extends over a surface of the retainer.

10. The mechanism of claim 1 wherein the keeper is operated by removing the keeper from the base.

11. The mechanism of claim 1, further including means for attaching a parachute canopy riser to said bar.

12. The mechanism of claim 1, further including means for attaching a parachute harness to said base.

13. The mechanism of claim 1, further including a second secure and release mechanism, wherein said second secure and release mechanism comprises the elements of the mechanism of claim 1, thereby forming a system.

14. The mechanism of claim 13, further including combined means for unlocking each apparatus of the system, such that a single operation releases both secure and release mechanisms.

15. A secure and release mechanism for detachably connecting two objects together, comprising:
   a. a base with slots to attach to a first strap;
   b. said base having a pocket, tabs, or groove to accept a pivot lever;
   c. said base having pocket, tabs, or groove to accept a retainer;
   d. said base having means to accept a locking mechanism;
   e. a ring for attaching to a second strap;
   f. a pivot lever with lip to facilitate pivoting;
   g. wherein the base mates with lip to form a fulcrum;
   h. said pivot lever having a scallop or channel for mating with said ring;
   i. said pivot lever having means for preventing incorrect insertion into said base;
   j. a retainer;
   k. locking means for securing said retainer, said ring and said pivot lever when nested into said base, said locking means adapted for easy release;
   l. means for initiating the rotation of said pivot lever with ring away from said base when released from said nested position whereby the objects attached to said base plate and said ring are released from being connected together, such rotation caused by the inherent instability of the system;
   m. means for limiting movement of said retainer, said ring and said pivot lever in relation to said base;
   n. said base having means for limiting rotation of said ring;
   o. a ripcord for securing said retainer, said ring and said pivot lever in said nested position in said base;
   p. means for releasing said retainer, said ring and said pivot plate from the nested position by operating said ripcord; and
   q. means for initiating the rotation of said pivot lever with said ring away from said base when released from said nested position whereby the objects attached to said base plate and said ring are released from being connected together, such rotation caused by the inherent instability of the system.

16. The mechanism of claim 15, further including means for attaching parachute canopy risers.

17. The mechanism of claim 15, further including means for attaching a parachute harness.

18. The mechanism of claim 15, further including a second secure and release mechanism, wherein said second secure and release mechanism comprises the elements of the mechanism of claim 15.

19. The mechanism of claim 18, further including combined ripcords for releasing each apparatus, such that a single operation releases both secure and release mechanisms.

20. A secure and release mechanism for quickly detaching a parachute, comprising:
   a. a base with slots to attach to a parachute harness
   b. said base having means to accept a pivot lever
   c. said base having means to accept a retainer
   d. said base having holes to accept a ripcord
   e. a ring for attaching to a parachute canopy riser
   f. means on said base, for limiting backward rotation of said ring
   g. a pivot lever with lip to facilitate pivoting
   h. wherein the base mates with lip to form a fulcrum
   i. said pivot lever having means for mating with said ring
   j. said pivot lever having means for preventing incorrect insertion into said base
   k. a retainer
   l. means on said base for limiting lateral movement of said retainer, said ring and said pivot lever in relation to said base
   m. a ripcord for securing said cover, said ring, said pivot lever and said base in said sandwiched position, such that said ripcord when threaded through said holes of said base exerts pressure on said cover
   n. the sandwiched position such that pressure on said cover is sufficient to secure said sandwiched position
   o. an unstable system formed by said secured cover, said ring, said pivot lever nested into said base when a load caused by a parachute is applied to said unstable system
   p. means for limiting movement of said cover, said ring and said pivot lever in relation to said base
   q. means for releasing said cover, said ring and said pivot lever from said sandwiched position by operating said ripcord
   r. means for initiating the rotation of said pivot lever with ring away from said base when released from said nested position whereby the parachutist and parachute attached to said base plate and said ring are released from being connected together, such rotation caused by the inherent instability of the system.

21. The mechanism of claim 20, further including a second secure and release mechanism, wherein said second secure and release mechanism comprises the elements of the mechanism of claim 20.

22. The mechanism of claim 21, further including combined ripcords for releasing each apparatus, such that a single operation releases both mechanisms.

* * * * *

UNITED STATES PATENT AND TRADEMARK OFFICE
CERTIFICATE OF CORRECTION

PATENT NO.          : 7,568,661 B2
APPLICATION NO. : 11/333632
DATED                    : August 4, 2009
INVENTOR(S)         : Eugene Bahniuk It is certified that error appears in the above-identified patent and that said Letters Patent is hereby corrected as shown below:

In the Claims:

Column 8, Line 6: Please insert the following after line 5, which was omitted from the original patent application:

--a.    a fulcrum defined by mating said pivot lever and said base
b.    said pivot lever having means for preventing incorrect insertion into said base
c.    an unstable system formed by locked retainer, said ring, said pivot lever nested into said base when a load is applied to said unstable system
d.    means for limiting movement of said retainer, said ring and said pivot lever in relation to said base--

Signed and Sealed this

Third Day of November, 2009

David J. Kappos
*Director of the United States Patent and Trademark Office*